US009934406B2

(12) United States Patent
Khan et al.

(10) Patent No.: US 9,934,406 B2
(45) Date of Patent: Apr. 3, 2018

(54) PROTECTING PRIVATE INFORMATION IN INPUT UNDERSTANDING SYSTEM

(71) Applicant: Microsoft Technology Licensing, LLC, Redmond, WA (US)

(72) Inventors: Omar Zia Khan, Bellevue, WA (US); Ruhi Sarikaya, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/592,094

(22) Filed: Jan. 8, 2015

(65) Prior Publication Data

US 2016/0203331 A1 Jul. 14, 2016

(51) Int. Cl.
*G06F 21/62* (2013.01)

(52) U.S. Cl.
CPC ...... *G06F 21/6245* (2013.01); *G06F 21/6254* (2013.01)

(58) Field of Classification Search
CPC .. G06F 21/60; G06F 21/6254; G06F 21/6245; G06F 21/606; G06F 21/10
See application file for complete search history.

(56) References Cited

U.S. PATENT DOCUMENTS

| 7,716,223 | B2 | 5/2010 | Haveliwala et al. |
| 7,930,197 | B2 | 4/2011 | Ozzie et al. |
| 7,983,961 | B1 | 7/2011 | Chang et al. |
| 8,200,847 | B2 | 6/2012 | LeBeau et al. |
| 8,751,439 | B2 | 6/2014 | Hakkani-tur et al. |
| 8,818,981 | B2 * | 8/2014 | Aftab ............... G06F 17/30867 707/706 |
| 9,080,890 | B2 * | 7/2015 | Svendsen ............ G01C 21/362 |
| 9,514,740 | B2 * | 12/2016 | Jost ....................... G10L 15/063 |
| 9,514,741 | B2 * | 12/2016 | Jost ....................... G10L 15/063 |
| 9,761,227 | B1 * | 9/2017 | Quillen ................. G10L 15/30 |
| 2004/0132428 | A1 | 7/2004 | Mulligan |
| 2005/0071328 | A1 | 3/2005 | Lawrence |
| 2006/0282408 | A1 | 12/2006 | Wisely et al. |
| 2010/0115028 | A1 | 5/2010 | McCullough |
| 2011/0252061 | A1 * | 10/2011 | Marks ............... G06F 17/30864 707/771 |
| 2012/0078727 | A1 | 3/2012 | Lee |
| 2012/0130709 | A1 | 5/2012 | Bocchieri et al. |

(Continued)

FOREIGN PATENT DOCUMENTS

EP 2375343 10/2011

OTHER PUBLICATIONS

PCT International Search Report in Application No. PCT/US2016/012248, dated Mar. 30, 2016, 10 pages.

(Continued)

*Primary Examiner* — Yonas Bayou

(57) ABSTRACT

Examples of the present disclosure include capturing an input at a local platform and transmitting the captured input to a service platform separate from the local platform. At least one partially evaluated policy generated by the service platform is received in response to the captured input. The local platform completes the partially evaluated policy by applying information private to the local platform to the partially evaluated policy. The local platform determines a final action for responding to the captured input based on completing the partially evaluated policy.

20 Claims, 8 Drawing Sheets

(56) References Cited

U.S. PATENT DOCUMENTS

| | | |
|---|---|---|
| 2012/0297017 A1 | 11/2012 | Livshits et al. |
| 2013/0218561 A1 | 8/2013 | Johnston et al. |
| 2014/0006027 A1 | 1/2014 | Kim et al. |
| 2014/0129226 A1 | 5/2014 | Lee et al. |
| 2014/0136210 A1 | 5/2014 | Johnston |
| 2014/0207442 A1* | 7/2014 | Ganong ............... H04W 12/02 704/201 |
| 2014/0236924 A1* | 8/2014 | Martynov ............. H04L 51/28 707/722 |

OTHER PUBLICATIONS

Johnson, et al.,"Voice Authentication Using Short Phrases: Examining Accuracy, Security and Privacy Issues", In Proceeding of the IEEE Sixth International Conference on Biometrics: Theory, Applications and Systems, Sep. 29, 2013, 9 pages.

Pathak, Manas A., "Privacy-Preserving Machine Learning for Speech Processing", In PhD Thesis, Apr. 26, 2012, 159 pages.

"Second Written Opinion Issued in PCT Application No. PCT/US2016/012248", dated Nov. 29, 2016, 6 Pages.

"International Preliminary Report on Patentability Issued in PCT Application No. PCT/US2016/012248", dated Feb. 27, 2017, 7 Pages.

\* cited by examiner

100

200

300

PROTECTING PRIVATE INFORMATION IN INPUT UNDERSTANDING SYSTEM

BACKGROUND

Input understanding systems utilize information about the user's personal data and context to consult various knowledge sources that contain information about various entities. This improves abilities of an input understanding system to interpret a user query as well as improve decision making in responding to a user query. As a result, the privacy of the user's information may be transmitted to a service residing outside a client where the information is originally stored. Thus, challenges are presented with respect to preserving confidentiality of a user's private information while leveraging knowledge repositories to increase robustness of an input understanding system. It is with respect to this general technical environment that the present application is directed.

SUMMARY

Examples of the present disclosure include capturing an input at a local platform and transmitting the captured input to a service platform separate from the local platform. At least one partially evaluated policy generated by the service platform is received in response to the captured input. The local platform completes the partially evaluated policy by applying information private to the local platform to the partially evaluated policy. The local platform determines a final action for responding to the captured input based on completing the partially evaluated policy.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
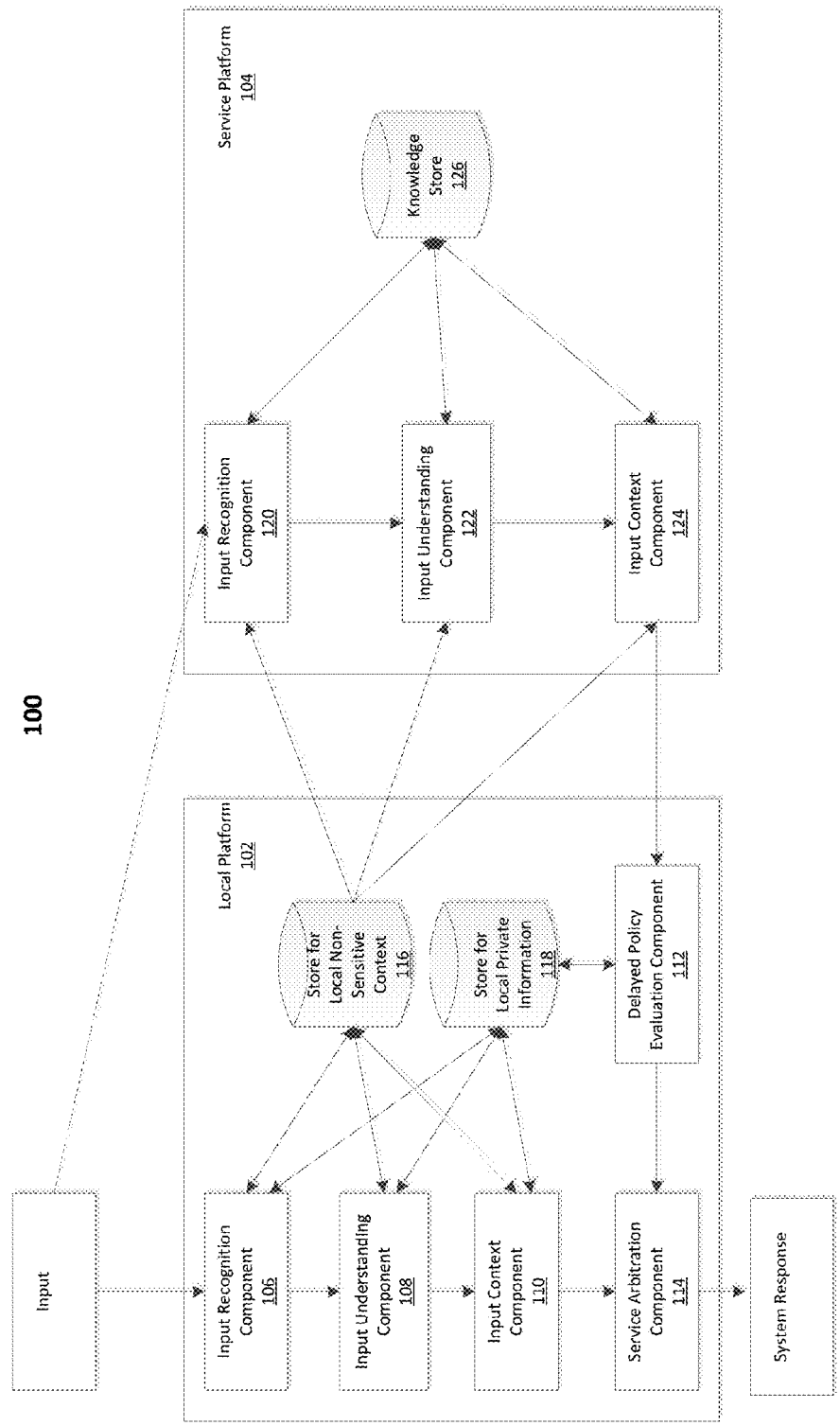
FIG. 1 illustrates an overview of an example system for input evaluation and response.

Examples of the present disclosure preserve confidentiality of user private information without giving up the advantage of using more robust models that leverage rich knowledge sources available under a service oriented architecture. A distributed and delayed policy evaluation mechanism is introduced in which the final determination of a correct choice/action is made at a component of a local platform. This allows an input understanding system to utilize confidential client information without requiring private information to be shipped to a conversational understanding service platform. Thus, private information of a user/client is not compromised.

As an example, an input understanding service works with available information and uses the available information to partially evaluate a policy. A policy is one or more actions for responding to an input. Available information may include any data that is not deemed private to a client (e.g., user or service). An input understanding service platform outside of the local platform is restricted from accessing the values of information that is deemed as sensitive thus private to the local platform. The input understanding service platform will instead generate and transmit a reduced model to the local platform, where the reduced model is a response formulated based on data available to the input understanding service platform that can be evaluated at the local platform without requiring significant computational resources.

In at least one example, the local platform may plug-in values related to information private to the local platform and makes a determination as to a final action based on the reduced model transmitted by the input understanding service platform and the private information available to the local platform. Instructions may be provided to the local platform by the input understanding service platform for completing evaluation of a policy. In some examples, the input understanding service platform determines that private information of a client (that is not available to the input understanding service component) may not result in any change to a chosen action. In that instance, the input understanding service platform may include instructions indicating to the local platform that further computation is not required for a policy model. The input understanding service platform transmits its current belief as to how to respond to an input pending the availability of information that is private or sensitive to a client. A local platform, having access to an input understanding service platform's belief with respect to further action and its' own private information, is able to readily determine a best response to an input without requiring further communication with the input understanding service platform.

A number of technical advantages are achieved based on the present disclosure including reduced network bandwidth usage and latency in interaction between components of an input understanding system, increased efficiency and accuracy in input understanding processing, increased data transmission security, improved processing security, and improved user interaction performance, among the other plurality of technical advantages. Examples described herein provide additional benefits including building sensitive inputs understanding systems that preserves the confidentiality and privacy of private information, retaining user's privacy sensitive information on a local platform (of client for user or service) by not shipping the sensitive/personal information to service platform (e.g., server), partially evaluating the policy on the input understanding service platform using any service side knowledge, and allowing finalization of policy choices on a local component without the requirement to hash/obfuscate private and/or sensitive information for transmittal back to an input understanding service platform outside of the local platform.

FIG. 1 illustrates an overview of an example system 100 for input evaluation and response. The system 100 is a combination of interdependent components that interact to form an integrated whole for execution of input understanding and processing. Components of the system 100 may be hardware components or software implemented on hardware components of the system 100. Each component of the system 100 may comprise one or more system components. In some examples, the system 100 may be an application or service running software components on a device having a processor (e.g., processing device). For instance, an input understanding application or service may be run on a processing device such as a computer, mobile phone, tablet, gaming console, electronic devices, etc., where components of the system may be executed on the processing device. In other examples, components of the system 100 may be spread across multiple devices. For instance, input entered on a client device and information may be processed or accessed from other devices in a network such as a server device and/or data store. Please refer to FIGS. 5-7 for additional examples of hardware that may be included as part of the system 100.

As one example, the system 100 includes components such as a local platform 102 and a service platform 104, each having one or more additional components. A platform, such as the local platform 102 and the service platform 104, is a collection of components of the system 100 that are used for processing input, analyzing input, determining response policies, and passing response policies to an input provider. In examples, the local platform 102 and the service platform 104 may include any of hardware components (operating system (OS)), software components (e.g., applications, application programming interfaces, virtual machines) running on hardware components, runtime libraries. In one example, the local platform 102 and the service platform 104 provide an environment for software components to run, obey constraints set for operating, and makes use of resources or facilities of the system 100. In at least one example, each component of the local platform 102 and the service platform 104 may be software running on one or more processing devices. The local platform 102 and the service platform 104 may also include components such as data storages/memory/stores, for example a knowledge store 126 shown in FIG. 1 and described below.

In an exemplary input understanding system, the local platform 102 and the service platform 104 operate in parallel, for example where a local platform 102 services data local (e.g., stored on a local component) to the local platform 102 and the service platform 104 is associated with data related to components separate from the local platform 102 (e.g., network component). However, the system 100 is not limited to such an example. The scale of systems such as system 100 may vary and include more or less components than those described in FIG. 1. Interfacing between components of the system 100 such as the local component 102 and the input service component 104 occur through a network connecting components of the system 100 and/or resources external to the system 100. In one example, components of the system 100 may be connected through a distributed environment such as a cloud computing environment.

The local platform 102 interfaces with the service platform 104 to provide a response to a received input. For example, the local platform 104 manages data local to a client (e.g., user or service) including private or sensitive information without access to additional knowledge resources. The service platform 104 manages additional knowledge resources to increase robustness of examining a received input without access to private or sensitive information maintained on the local platform 102. However, one skilled in the art will recognize that information maintained on each of the local platform 102 and the service platform 104 may vary in different examples.

Components of the system 100 interface with an OS of a processing device to allow input understanding and processing including a user interface (UI) for entering an input and receiving a response. For example, the system 100 may receive input from a client (e.g., user or service) at one or more of the local component 102 and the input service component 104. An input reception component provides an interface for a user to enter an input and have the system 100 capture and process the input and return a response. In one example, the system 100 may be an input understanding system such as a conversational understanding (CU) system. However, the system 100 possesses processing means are configurable to handle any type of input including but not limited to speech/voice input, text input, gesture input, handwritten input, among other examples. As an example, the system 100 may operate as an intelligent personal assistant. An intelligent personal assistant is a mobile software agent that can perform tasks, or services, for an individual based on user input, location awareness, and the ability to access information from a variety of online sources. Examples of intelligent personal assistants that the system 100 may operate with include but are not limited to SILVIA, S-Voice, Voice Mate, Google Now, Cortana, Hidi and Siri, among other examples.

The system 100 captures and interprets an input via an input recognition component. An input recognition component is a component that enables information/data in the form of an input to enter into the system 100 and allow the system 100 to communicate or interact with a user. An input recognition component captures processes and translates a received input for recognition. As an example, the input recognition component 106 may be able to process spoken queries into text. The input recognition component 106 may implement automatic speech recognition (ASR), computer speech recognition, or speech to text (STT), among other examples, to process speech to text for evaluation. An input recognition component may be a component of the local component 102 such as input recognition component 108 and/or a component of an input service component 104 such as input recognition component 122. Input recognition components 108 and 122 enable a user to enter input to be analyzed and processed. As identified above, input can be in any form including speech/voice input, text input, gesture input and handwritten input, among other examples. Input recognition components 108 and 122 interface with an OS of a processing device to provide a user interface for a user to enter input into the system 100. As an example, input recognition components 108 and 122 may display a prompt upon request for input entry from a user. In one example, a user input prompt is initiated by a user taking action (e.g., clicking on an icon, pressing a button, making a verbal request, gesturing, etc.). In alternative examples, a prompt for user input is displayed on an OS for a user to enter input. Input recognition components 108 and 122 may interface with other components of the OS. Examples of other components include but are not limited to control devices, display devices, headsets, mobile devices (e.g., WIFI, infrared or Bluetooth enabled), input panels (e.g., soft input panel, speech input panel), other electronic devices, etc., that are usable in coordination with the input recognition components 108 and 122 to enable interaction with a client such as a user or service. In some examples, input recognition components 108 and 122 interface with other components of the system 100, for example an input understanding component such as input understanding component 108 and input understanding component 122. Input recognition component 106 also interfaces with a store for local non-sensitive context 116 and a store for local private information 118 on the local platform 102. Input recognition component 120 also interfaces with the store for local non-sensitive context 116 of the local platform and knowledge store 126 on the service platform 104.

The store for non-sensitive context 116 is a data store maintained on the local platform 102 that stores information that is able to be transmitted to the service platform 104 to leverage service resources in order to enhance a response to a captured input. Non-sensitive context information may be identified as non-sensitive by a user of the local platform 102 or by the local platform 102 based on data such as protocols, management policies and rule sets. The store for non-sensitive context 116 is utilized by components of the local platform 102 to generate responses to input received. Additionally, the store for non-sensitive context 116 interfaces with components of the service platform 104 for application of resources outside of the local platform 104 to improve a response to an input received.

The store for private information 118 is a data store maintained on the local platform 102 that stores information that is used only by the local platform 102. Private information or sensitive information is any information that is not transmitted over a network or shared with the service platform 104. Examples of private information include but are not limited to personally identifiable information, contact information, message/email data, login information, phone address book, file data and network information, among other examples. It can also include information that may not be privacy-sensitive in nature, but cannot be transmitted to the service due to third-party licensing or contractual obligations. For example, the client may be aware which person a user is connected to on a social network, but transmission of such information may be restricted due to contractual restrictions imposed by the social network. A client (e.g., user or service associated with the local platform 102) may identify or designate information as private information or alternatively may identify information that it does not wish to share with the service platform 104. For instance, a service (e.g., distributed or shared service) may prompt a user to share or upload information such as contact information. In that example, if a client elects to not share contact information with the service, that contact information is considered private information and a service will not be able to use that as additional information for input understanding. In another example, rules or protocol implemented may not allow private information to be shared with the service platform 104. Thus, a service platform such as service platform 104 would be unable to utilize private information to make decisions about how to respond to an input.

The service platform 104 maintains at least one knowledge store 126 to store knowledge data used to assist the service platform 104 in developing policies for responding to a received input. Policies are one or more actions for responding to an input. In some examples, policies are conditional actions that are generated by the service platform 104 that are able to be completed by the local platform 102. For example, a policy may be conditional based on the private information maintained by store for private information 118 on the local platform 102. The local platform 102 may input data associated with the private information to complete a partially issued policy generated by the service platform 104.

Knowledge data of the knowledge store 126 is applied by the service platform 104 to generate such partially evaluated policies for responding to an input. Knowledge data increases the amount of information the system 100 has so that it may make more informed decisions at a given point in time. Types of information that the knowledge store 126 may maintain include but are not limited to information on: definitions, rules, name data, historical data (including data from previous queries), interrelationships between components of the system 100, restrictions (e.g. formal stated descriptions of truth for evaluating data), classes (e.g., collections, concepts, programming types), attribute data (e.g., properties, features, characteristics, parameters), axioms, modeling and statistical data, events and functional terms, among other examples. The knowledge store 126 may also communicate with components or resources outside of the system 100 to gather or collect information relevant to performing processing and making a best possible decision as to how the system 100 may respond to an input. As an example, the knowledge store 126 may be linked to network resources over the Internet, for example search engines (e.g., Bing, Google Search, Yahoo Search, Ask, WebCrawler, Dogpile, etc.) or any other knowledge repositories (e.g., Wikipedia, IMDB, Quora, Stack overflow, Amazon etc.). Components of the service platform 104 such as the input recognition component 120, the input understanding component 122 and the input context component 124, may interface with the knowledge store 126 for generation of partially evaluated policies based on knowledge data. Knowledge data of the knowledge store 126 may be used by components of the service platform 104 to enhance generation of policies for responding to an input.

At any point during processing, the local platform 102 may determine that additional information is needed to generate policies for responding to a captured input, for example during processing by the input recognition component 106, the input understanding component 108 or the input context component 110. Alternatively, protocols related to a system such as system 100 may execute processing for a captured input on each of a local platform 102 and a service platform 104 to improve processing results. In some examples, input may be processed by a component other than that of the local platform 102, for example where an input is passed through a third-party application or service.

Once an input is recognized, an input recognition component passes a recognized input to an input understanding component such as input understanding component 108 of the local platform 102 or the input understanding component 122 of the service platform 104. Input understanding components 108 and 122 analyze the recognized input for understanding including determining understanding/alternative understandings of the analyzed input. Understandings of the received input are interpretations of the received input by the system 100 based on analysis of the received input by the system 100. As examples, input understanding components 108 and 122 may be a natural language understanding (NLU) unit or a spoken language understanding (SLU) unit. Aspects of the input may be analyzed to determine understanding of the received input. Examples of aspects analyzed by the input understanding component 108 include but are not limited to: tagging of parts of the input, syntactic/semantic parsing of the input, proper name identification from the input, input classification, etc. Analysis of the received input may include application of knowledge data from a data store of the local platform 102 when processed by components of the local platform 102 and the knowledge store 126 of the service platform 104 when processing occurs by the service platform 104. In examples, the local platform 102 may pass the captured input to the service platform 104 for processing. As an example, the knowledge store 126 maintains information such as rules for input understanding processing, semantic parsing of input, rules and methods for identifying portions of the input and slotting of data associated with the input, etc. Such information is useful for enabling an input understanding component 122 with developing an understanding for a captured input.

Understandings determined by an input understanding component are passed to an input context component for further evaluation. Input context components such as input context components 110 (of the local platform 102) and 124 (of the service platform 104) evaluate context of the analyzed input including determining possible responses for the analyzed input and strategy for responding to a user. Evaluation of the context of understandings for a received input includes clarifying the meaning of the received input. When an input is passed to an input context component 124, the input context component 124 interacts with the knowledge store 126 to further analyze understandings determined by an input understanding component. As an example, the input context component 124 may apply knowledge data to an analyzed input to determine a state associated with an input so that the system 100 may make a determination as to how to proceed/respond to a received input. For example, an input context component such as input context component 124 determines a context for the received input, and parameters associated with a context (e.g., what information may be needed to execute a task associated with a received input and what additional information needs to be requested based on its evaluation of the received input and understandings). The system 100, via an input context component, intelligently evaluates the flow/state of a conversation at the point of determining a context for the received input. The knowledge store 126 maintains information useful to the input context component 124 in making informed decisions regarding contextual evaluation of a received input. Knowledge data maintained by the knowledge store 126 include but is not limited to: policy rules for interpreting user input and analyzed understandings, historical data with respect to present and past user interaction, usage patterns, word associations, access to components or resources external to the system 100, etc.

Based on evaluation of the understandings of the received input, an input context component determines possible policies for responding to an input. Examples of context evaluated by the input context component include but are not limited to previous snippets of conversation, syntax and grammar, and time of day, location of the user, among other examples. As an example, a policy developed by an input context component 124 may be a partially evaluated policy that requires information to fully complete the policy. That is, the service platform 104 uses information that is available to it to generate as much of a policy as it possibly can. However, in some cases, the service platform 104 may lack information needed to make a final decision as to how to respond to the received input, for example when the service platform 104 is unsure of what private information is maintained by the local platform 102. In that example, the input context component 124 passes one or more partially evaluated policies to the local platform 102 so that the local platform 102 is able to make a final decision about policy selection in response to an input. In examples where the local platform 102 generates policies for an input, a fully evaluated policy may be generated using the information available to the input context component 110, for example, data from the store for local non-sensitive context 116 and the store for local private information 118. An example of when a local platform 102 may not require evaluated policies from the service platform 104 is a case where an input received is "Call Ruhi." The local platform 102 may capture and process the input and identify that a contact named "Ruhi" is stored in the contact list stored on the local platform 102. In one example, the contact list for the local platform 102 is stored as private information in the store for local private information 118. The input context component 110 of the local platform 102 is able to accurately generate a policy (e.g., perform an action of calling "Ruhi" from the contact list) for the received input without further clarification. In another example, the local platform 102 identifies that no contact named "Ruhi" exists in the contact list stored locally. The local platform 102 may transmit the received input to the service platform 104 for processing in order to provide a context for an input of "Call Ruhi." In that example, the service platform 104 develops partially evaluated policies (e.g., possible actions for responding to the received input subject to finalization by the local platform 102). The service platform 104, via the input context component 124, sends the partially evaluated policies to the local platform 102 for further evaluation.

When policies generated by the service platform 104 are transmitted to the local platform 102, the delayed policy evaluation component 112 of the local platform 102 receives and processes the policies from the service platform 104. A delayed policy evaluation mechanism implemented using the delayed policy evaluation component 112 allows the system 100 to create an intermediate model that has already incorporated resources of the service platform 104 but delays the determination of the final choice to be made by the local platform 102. The intermediate model (e.g., partially evaluated policy) is then evaluated by the delayed policy evaluation component 112 where resources of the local platform 102 are applied to complete policy modeling. As an example, the delayed policy evaluation component 112 plugs in information available to the local platform 102 (e.g., private information) to complete a partially evaluated policy so that the local platform 102 is able to evaluate properly evaluate policies received from the service platform 104. This enables the local platform 102 to make the best choice in responding to a received input. In one example, the delayed policy evaluation component 112 completes parameters associated with a partially evaluated policy that pertain to private information maintained by the local platform 102. At least one benefit of the described delayed policy evaluation includes leveraging server knowledge resources while preserving private information of a local platform 102. Communication overhead between the local platform 102 and the service platform 104 is also minimized, for example, by not requiring the local platform 102 to make perform any cryptographic hash or use other obfuscation techniques for preserving privacy of sensitive materials, which are then transmitted back to the service in hashed/obfuscated manner. The local platform 102 executes computation and calculation that requires use of the private or sensitive information, for example by the delayed policy evaluation component 112. Thus, private information is not subject to any disclosure due to any issues with the obfuscation scheme or other breaches and communication hops required between the local platform 102 and the service platform 104 are reduced by not requiring data to be transmitted back and forth between platforms. Consequently, the latency of associated with network data exchange can be minimized.

In addition to completing evaluation of policies transmitted by the service platform 104, the delayed policy evaluation component 112 further evaluates policies transmitted by the service platform 104 upon completion to determine a best possible response option. The delayed policy evaluation component 112 is configured to be able to compare completed policies to determine one or most response options that would address user intention for a received input. In some examples, comparison of policies may occur based on subjective measures or empirical data. Examples of subjective measures include but are not limited to: data for idempotency versus non-idempotency, time sensitivity, historical usage patterns and user interactions, among other examples. Examples of empirical data collected include data on annotated sessions and data from randomized experimentation. In examples, comparison of policies include statistical modeling and/or ranking of policies whereby metrics may be applied to rank completed policies and a number of highest ranking policies can be selected to be presented in response to the received input. As an example, ranking of policies is based on confidence values for a policy (response option) and parameters associated with the policy, where a confidence value may be assigned to a policy based on a systems certainty with respect to the policy and the parameters associated with the policy. In some examples, the local platform 102 includes one or more additional data stores for information pertaining to computational evaluation of policies. The delayed policy evaluation component 112 passes selected policies to the service arbitration component 114 to be output as a system response.

The service arbitration component 114 is a component of the local platform 102 that determines whether to use a policy generated by the service platform 104 or a policy generated by the local platform 102 for responding to a received input. In some examples, the local platform 102 identifies that it does not have enough information to generate an appropriate response, and thus one or more policies of the service platform 104 is selected by the delayed policy evaluation component 112 and the service arbitration component 114 determines to output policies of the service platform 104. In other examples, the local platform 102 is certain that the local platform 102 possesses enough information to generate an appropriate response and thus selects one or more policies generated by the local platform 102 to be transmitted by the service arbitration component 114. In that case, the service arbitration component 114 determines to output policies generated by the local platform 102. In at least one example, the service arbitration component 114 transmits more than one policy to a user presenting options for responding to an input, where policies transmitted may include policies generated by each of the local platform 102 and the service platform 104. In other examples, pluralities of policies are transmitted to a user from one of the local platform 102 or the service platform 104.

Figure 2:
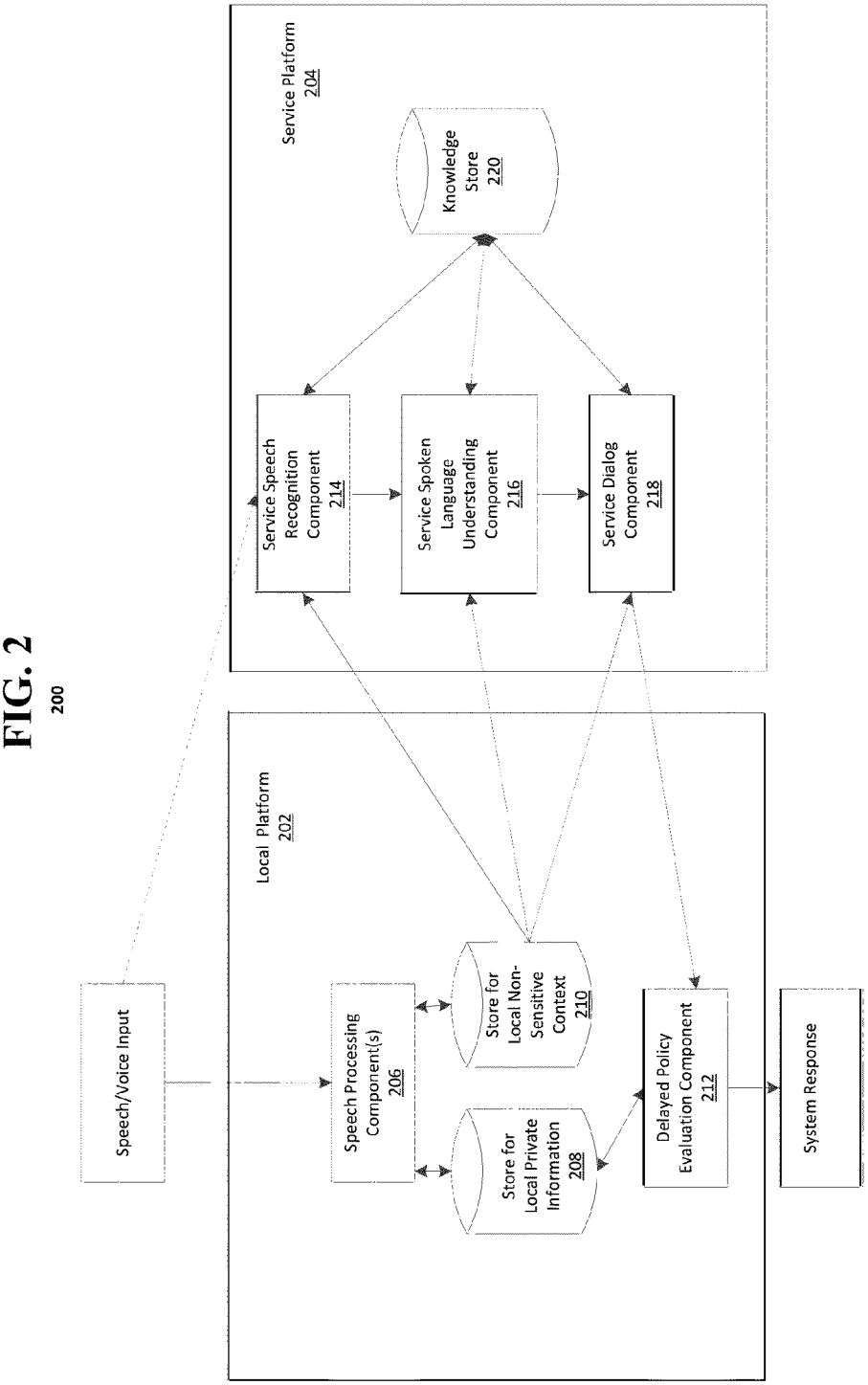
FIG. 2 illustrates an overview of an example system for speech input evaluation and response.

FIG. 2 illustrates an overview of an example system 200 for speech input evaluation and response. System 200 is an example of a specific implementation of system 100 described in FIG. 1. System 200 is a conversational understanding system configurable to receive, process and respond to a speech or voice input. System 200 may include a combination of hardware and software components for responding to a speech or voice input.

As an example, a speech or voice input is captured, for example, where the captured input is "Call Fred Meyer." Locally, a local platform 202 may have a contact named "Fred Meyer" in its address book or list of contacts. If that is the case, the local platform 202 can recommend a response to the input without having to contact an input service component through its speech processing components 206. Examples of processing components included in the speech processing components 206 include, a speech recognition (SR) component, a spoken language understanding (SLU) component, and a dialog component, which are examples of the input recognition component 106, the input understanding component 108 and the input context component 110 respectively, described above in the description of FIG. 1. The local platform 202 includes two or more data stores, for example a store for local private information 208 and a store for local non-sensitive context information 210, that are accessible by the speech processing components 206 of the local platform 202. As an example, stores 208 and 210 correspond to the store for local private information 118 and the stores for local non-sensitive context 116 respectively, described in further detailed with above with respect to the description of FIG. 1. Information from the store for local non-sensitive context information 210 interfaces with the service platform 204 to provide information from the local platform 202 to the service platform 204 that is non-sensitive.

If the local platform 202 does not locally store a contact named "Fred Meyer", then the local platform 202 transmits captured input to the service platform 204 for processing to return possible actions or recommendations. In other examples, the local platform 202 may interface with the service platform 204 to improve actions or recommendations returned based on a received input. The local platform 202 may identify a local contact of "Fred" and pass the input to the service platform 204 to for further evaluation of the context for the received input, among other reasons because it is unsure if the contact "Fred" is who a user intended to call. The service platform processes the captured input using its own SR, SLU and dialog components, which are examples of the input recognition component 120, the input understanding component 122 and the input context component 124 respectively, described above in the description of FIG. 1.

The service platform 204 provides context for the received input of "Call Fred Meyer." For instance, a user may have meant to call Fred Meyer grocery store rather than call a contact named Fred Meyer. The service platform 204 can look up "Fred Meyer" and provide recommended actions or policies including a phone and address for Fred Meyer grocery. However, the service platform 204 will not know whether a contact of "Fred Meyer" is stored locally on the local platform 202 because the local platform 202 has not shared such private information with the service platform 204. The service platform 204 partially evaluates policies (e.g., actions) for responding to the captured input by providing context for one or more policies based on the information available to the service platform 204. The service platform 204 also identifies information that it does not possess and requires to be completed by the local platform 204, for example, private information stored locally on the local platform 204.

Once partially evaluated policies are generated, the service platform 204 transmits partially completed policies to the local platform 202 for further evaluation. One or more policies (or actions) may be presented by the input service component for final evaluation by the client component. For example, one policy may say that if a client named "Fred Meyer" exists in the local contact list which is not shared with the input service component then contact Fred Meyer. Another policy may say that if there is no "Fred Meyer" in a local contact list, then provide the phone number and/or place a call to a Fred Meyer grocery store closest to the location of a device that made the input. In some examples, the service platform 204 includes instructions for completing evaluation of the transmitted policies to the local platform 202 with the partially evaluated policy or in other cases as a separate transmission to the local platform 202. In another example where a received input includes a name such as "Fred", an input understanding system or service may not find any user named "Fred" in the address book but the service can point out that Fred can also be a short name for "Frederick" or "Alfred" or "Wilfred," for example. This information may not be available to a local platform so a service is providing additional context in this case. Similarly, a service platform can also point out that "Freddie" or "Freddy" are also common names used in place for "Fred" that a local platform can instead search on the address book. In yet another example, a service platform can contribute in the same vein is the case of homophones. A local platform may ultimately use the top recognized form of an input (such as a speech input) however a service platform can return a bunch of homophones for the same word and a local platform can then search if any of those exist. For instance, if a local platform recognizes an input of "Call John," a service platform can return "Jon" as homophone for a name of "John."

Before providing a response to the received input, the local platform 202 evaluates the policies generated by the service platform 202 and makes a final determination as to how to respond to the received input without having to further consult with the service platform 204. Evaluation and selection of a policy of the service platform 104 is performed by a delayed policy evaluation component 212. Description of the delayed policy evaluation component 212 parallels the delayed policy evaluation component 112 described in the description of FIG. 1. As an example, in a policy recommendation, the service platform 204 may identify parameters or information for the client component to check for a contact of "Fred" stored locally. In that example, the local platform 202 may be able to identify that an address or a phone number associated with a contact of "Fred" is the same phone number for a local Fred Meyer grocery store. The policy evaluation component 212 interfaces with the store for local private information 208 to complete a policy that was partially evaluated by the service platform 208. For instance, the policy evaluation component 212 interfaces with the store for local private information 208 to evaluate a contact list for Fred Meyer. Based on the evaluation, the delayed policy evaluation component 212 selects an action for responding to the captured input. For example, if "Fred Meyer" is not a contact in a contact list or a contact of "Fred" does not associate with "Fred Meyer" then the delayed policy evaluation component 212 may select an action associated with call a local Fred Meyer grocery store. Thus, the local platform 202 can confidently identify a response action to the received input by evaluating a policy generated by the service platform 204 using the private information stored on the local platform 202. Once the delayed policy evaluation component 212 has selected a policy for response to the captured input, the delayed policy evaluation component 212 outputs a response policy to a user.

In an alternative example, speech or voice input may be received directly at the service platform 204, processed by components of the service platform 204 including the service speech recognition component 214, the service spoken language understanding component 216 and the service dialog component 218. The Speech or voice input may be received at the service platform 204 from a component outside of the local platform 202 (either in the system 200 or a resource external to the system 220) interfacing with the service platform 204. Partially evaluated policies are still generated by the service platform 202 and transmitted to the local platform 202, for example the delayed policy evaluation component 212, for further evaluation.

Figure 3:
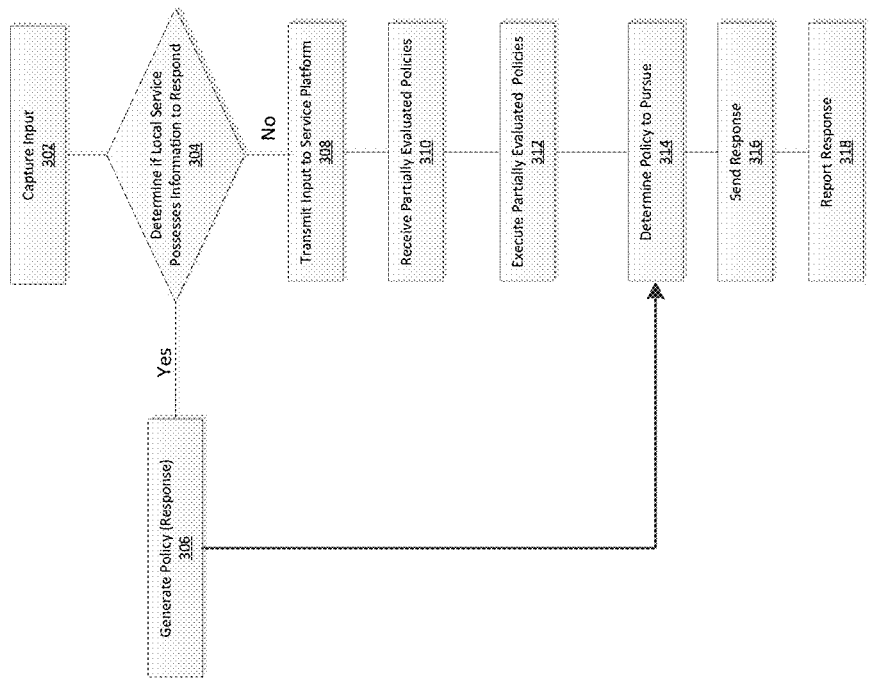
FIG. 3 illustrates an example method of processing by a local component.

FIG. 3 illustrates an example method 300 FIG. 3 illustrates an example method of processing by a local platform such as the local platform 102 described in FIG. 1 and the local platform 202 described in FIG. 2. As an example, method 300 may be executed by a system such as the system 100 of FIG. 1, the system 200 of FIG. 2 or any system comprising at least one processing device configured to store and execute programs or instructions. However, method 300 is not limited to such examples. Method 300 may be performed by one or more processing devices. In other examples, method 300 may be performed by an input understanding service or application.

Flow begins at operation 302, where an input is captured. As an example, an input is captured by a component of a device having an application or service operating thereon to receive and process an input. Once a received input has been captured, flow proceeds to decision operation 304 where a local service determines if it possesses enough information to respond to the captured input. As an example, a local service is a local platform. Description of a local platform is provided above in the description of FIG. 1 (local platform 102) and FIG. 2 (local platform 202). In a case where it possesses enough resources/information to generate a response to the captured input, flow proceeds to operation 306 where at least one policy is generated by the local service for responding to the captured input. A policy is one or more actions for responding to an input. In some examples, policies are conditional actions that are generated by a service platform that are able to be completed by the local service. In one example, a policy is developed having multiple actions that can be selected (and executed) based on the information in possession of the local service. For instance, a policy may be conditional based on the private information maintained by the local service where an action occurs if private information of the local service completes the policy and another action occurs if private information does not complete the policy.

When flow proceeds to operation 306, generated policies are evaluated and a determination (operation 314) is made as what policy to pursue in response to the captured input. When a policy is selected, a response (operation 316) is sent via the local service to a provider of the input. As an example, the response sent may be an action performed based on the selected policy. As an example, a received input may be "Send an Email to Omar." In that case, a selected policy may be an action to open an e-mail to a contact named "Omar." After the response is sent, the local service reports (operation 318) the response provided to the service platform. This keeps the service platform up to date with responses provided and allows the service platform to include such information in its knowledge resources for generating future policies.

Turning back to decision operation 304, the local service may determine that it does not possess enough information to generate a policy or response to the captured input. In that case, flow proceeds to operation 308 where the input is transmitted to a service platform. Description of a service platform is provided above in the description of FIG. 1 (service platform 104) and FIG. 2 (service platform 204). Once the service platform receives the captured input, the service platform may process the input and generate partially evaluated policies based on the captured input. The service platform transmits the partially evaluated policies to the local service, which receives the partially evaluated policies generated by the service platform in operation 310.

Flow then proceeds to operation 312 where the local service executes the partially evaluated policies. Execution of the partially evaluated policies may include following processing instructions provided by the service platform. Execution of the partially evaluated policies includes applying information of the local service to the partially evaluated policies. For example, private information maintained on a device running the local service may be accessed and applied to the partially evaluated policies. In one example, the local service plugs in values associated with information private to a local device or the local service to complete evaluation of policies provided by the service platform.

Once, policies are fully evaluated, the local service makes a determination (operation 314) as what policy to pursue in response to the captured input. After the response is sent, the local service reports (operation 318) the response provided to the service platform.

Figure 4:
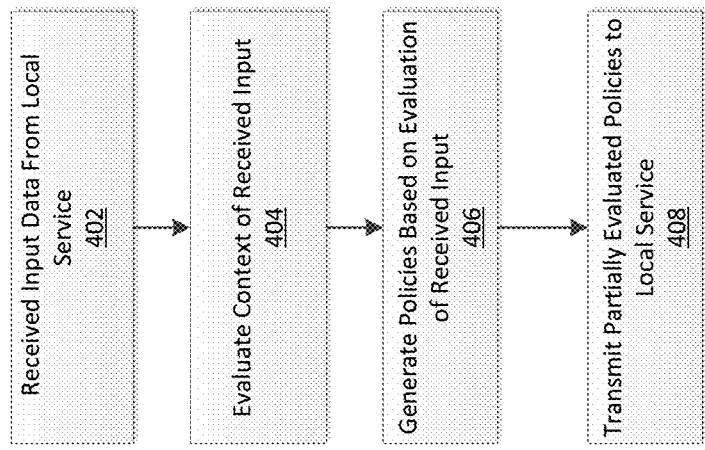
FIG. 4 illustrates an example method of processing by an input understanding service component.

FIG. 4 illustrates an example method of processing by an input service component. As an example, method 400 may be executed by a system such as the system 100 of FIG. 1, the system 200 of FIG. 2 or any system comprising at least one processing device configured to store and execute programs or instructions. However, method 400 is not limited to such examples. Method 400 may be performed by one or more processing devices. In other examples, method 400 may be performed by an input understanding service or application.

Flow of method 400 begins at operation 402 where input is received at a service platform from a local service. A local service is program or application associated with a local platform as described in FIG. 1 (local platform 102) and FIG. 2 (local platform 202). Description of a service platform is provided above in the description of FIG. 1 (service platform 104) and FIG. 2 (service platform 204). An input may be received at a component of a service platform from a component of a local service.

At operation 404, a context is evaluated for a received input. Evaluation of a context for a received input is described with reference to input context components 110 and 124 detailed in the description of FIG. 1. Policies for responding to the received input are generated (operation 406) based on evaluation of the context for the received input. As identified previously, a policy is one or more actions for responding to an input. Policies may be conditional based on information possessed by a local service that a service platform may not have access too. Generation of the partially evaluated policies may include populating a policy with information that a service platform is able to provide and identifying information that is not available to the service platform, for example private information maintained by the local service. Using knowledge resources available to the service platform (e.g., knowledge store 126 of FIG. 1), the service platform is able to identify parameters that it is able to complete and parameters that require the local service to fill in. The service platform may generate instructions in association with its partially evaluated policies so that the local service is readily able to complete the partially evaluated policies without significant computational resources. The service platform then transmits (operation 408) the partially evaluated policies to the local service for the local service to complete the policies and make a final decision as to how to respond to a received input.

Figure 5:
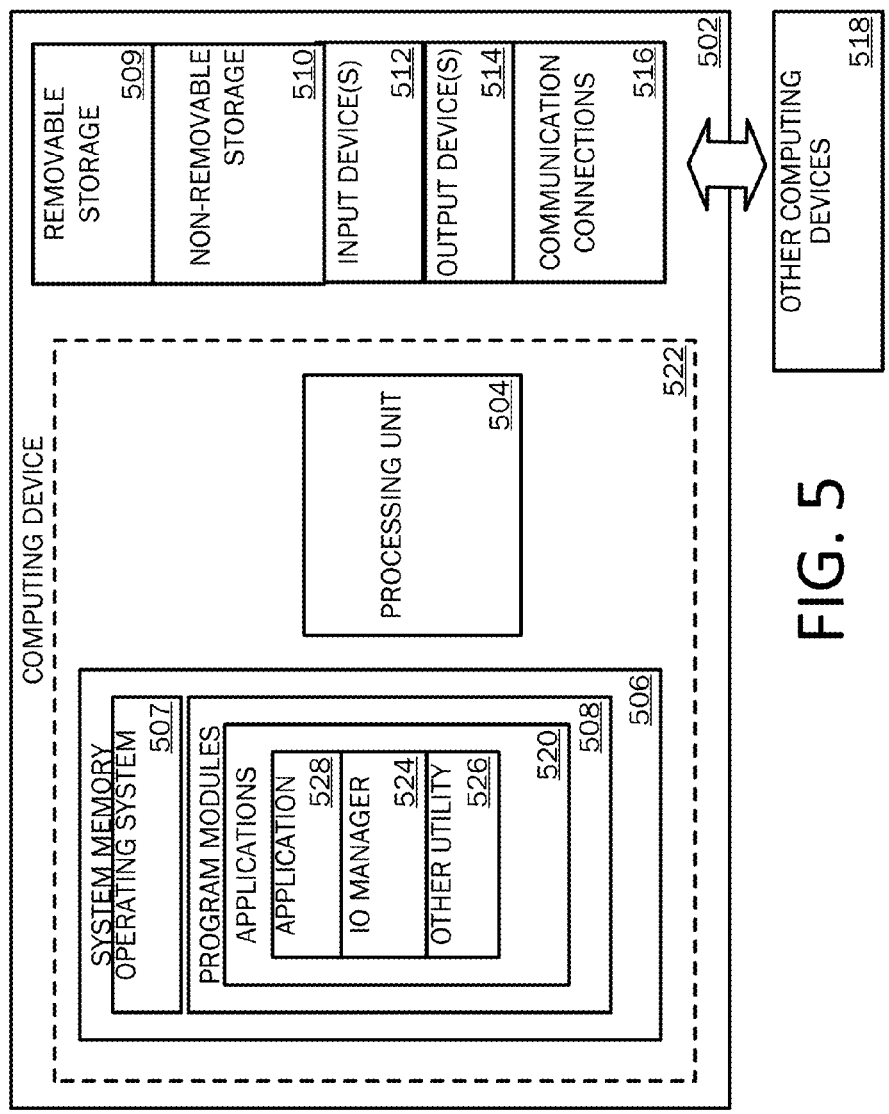
FIG. 5 is a block diagram illustrating an example of a computing device with which aspects of the present disclosure may be practiced.
Figure 6A:
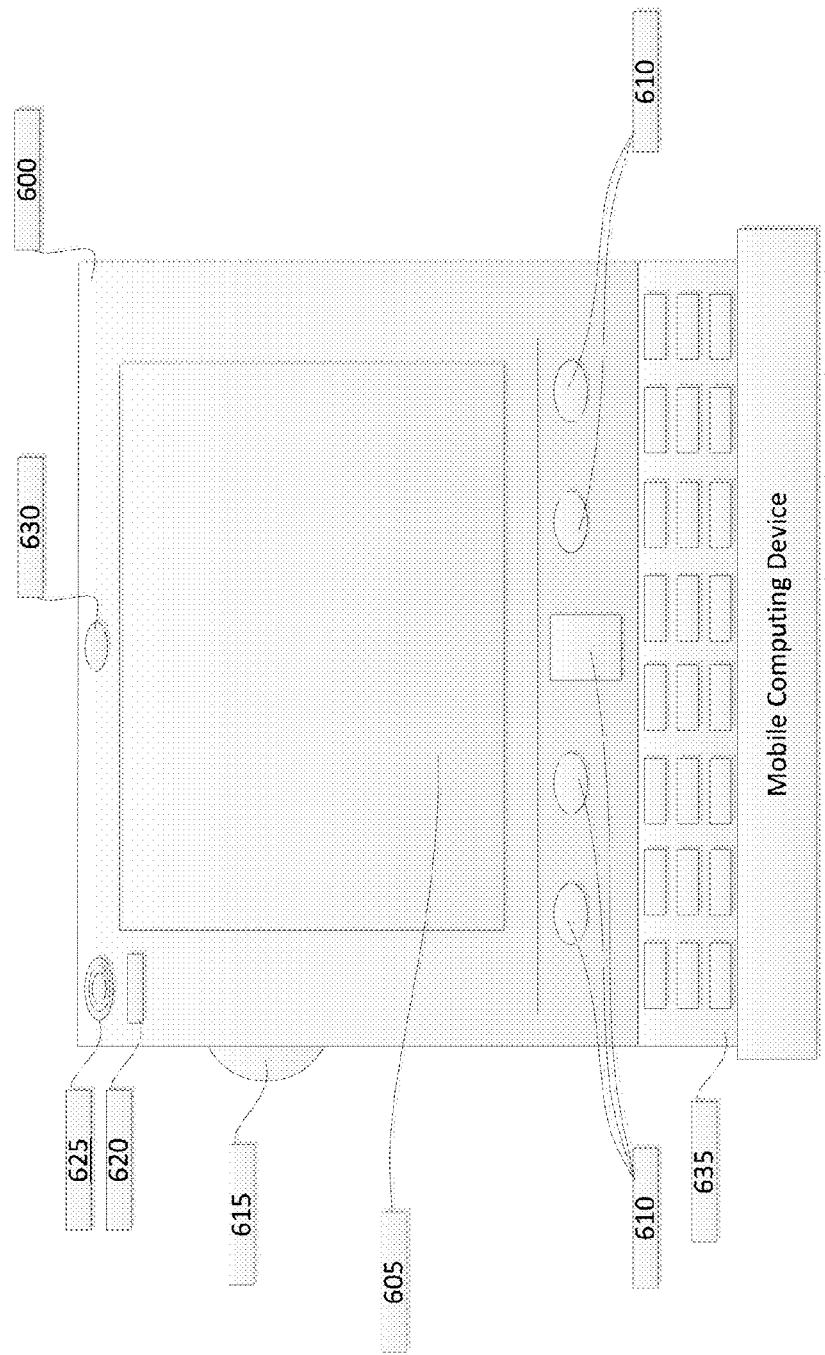
FIGS. 6A and 6B are simplified block diagrams of a mobile computing device with which aspects of the present disclosure may be practiced.
Figure 6B:
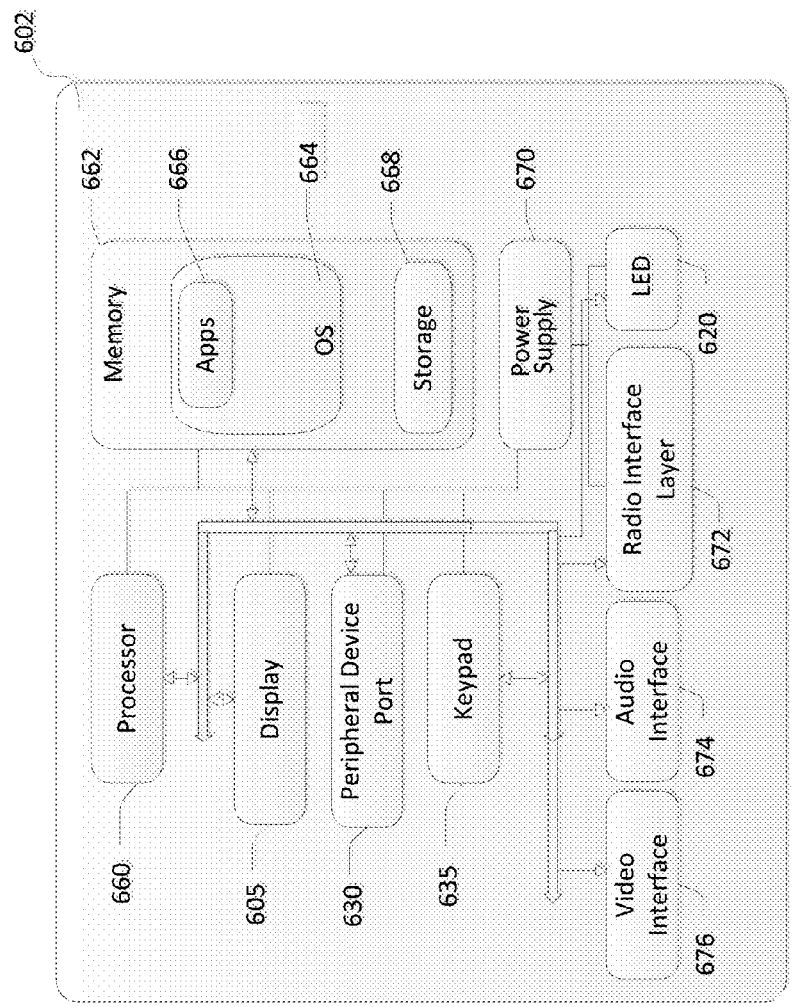
Figure 7:
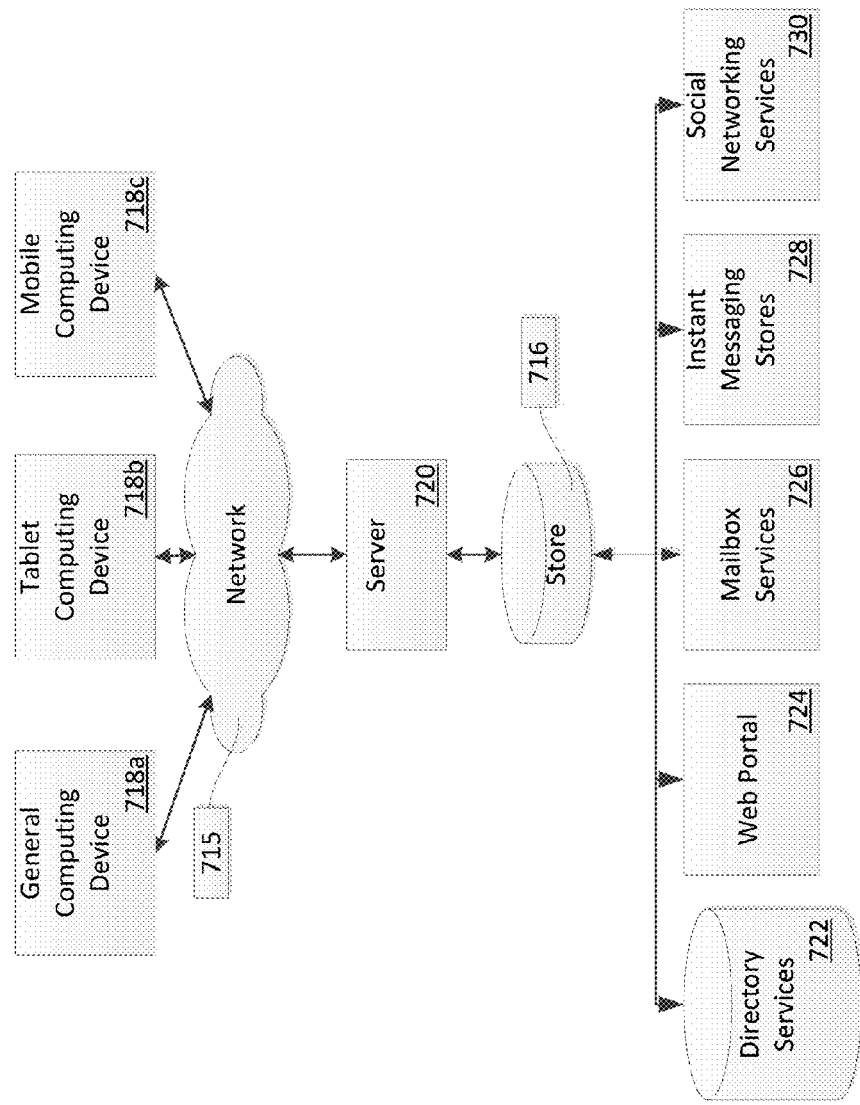
FIG. 7 is a simplified block diagram of a distributed computing system in which aspects of the present disclosure may be practiced.

FIGS. 5-7 and the associated descriptions provide a discussion of a variety of operating environments in which examples of the invention may be practiced. However, the devices and systems illustrated and discussed with respect to FIGS. 5-7 are for purposes of example and illustration and are not limiting of a vast number of computing device configurations that may be utilized for practicing examples of the invention, described herein.

FIG. 5 is a block diagram illustrating physical components of a computing device 502, for example a component of an input understanding system with which examples of the present disclosure may be practiced. The computing device components described below may be suitable for the computing devices described above. In a basic configuration, the computing device 502 may include at least one processing unit 504 and a system memory 506. Depending on the configuration and type of computing device, the system memory 506 may comprise, but is not limited to, volatile storage (e.g., random access memory), non-volatile storage (e.g., read-only memory), flash memory, or any combination of such memories. The system memory 506 may include an operating system 507 and one or more program modules 508 suitable for running software applications 520 such as application 528, IO manager 524, and other utility 526. As examples, system memory 506 may store instructions for execution. Other examples of system memory 506 may components such as a knowledge resource. The operating system 507, for example, may be suitable for controlling the operation of the computing device 502. Furthermore, examples of the invention may be practiced in conjunction with a graphics library, other operating systems, or any other application program and is not limited to any particular application or system. This basic configuration is illustrated in FIG. 5 by those components within a dashed line 522. The computing device 502 may have additional features or functionality. For example, the computing device 502 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 506. While executing on the processing unit 504, the program modules 508 (e.g., application 528, Input/Output (I/O) manager 524, and other utility 526) may perform processes including, but not limited to, one or more of the stages of the operational methods 300-400 illustrated in FIGS. 3 through 4, for example. Other program modules that may be used in accordance with examples of the present invention may include electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 502 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 502 may also have one or more input device(s) 512 such as a keyboard, a mouse, a pen, a sound input device, a device for voice input/recognition, a touch input device, etc. The output device(s) 514 such as a display, speakers, a printer, etc. may also be included. The aforementioned devices are examples and others may be used. The computing device 504 may include one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 506, the removable storage device 509, and the non-removable storage device 510 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 502. Any such computer storage media may be part of the computing device 502. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a personal data assistant, a tablet personal computer, a laptop computer, and the like, with which examples of the invention may be practiced. For example, mobile computing device 600 may be implemented as systems 100 or 200, components of systems 100 or 200 may be configured to execute processing methods as described in FIGS. 3-4, among other examples. With reference to FIG. 6A, one example of a mobile computing device 600 for implementing the examples is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative examples, mobile computing device 600 may incorporate more or less input elements. For example, the display 605 may not be a touch screen in some examples. In yet another alternative example, the mobile computing device 600 is a portable phone system, such as a cellular phone. The mobile computing device 600 may also include an optional keypad 635. Optional keypad 635 may be a physical keypad or a "soft" keypad generated on the touch screen display. In various examples, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 can incorporate a system (i.e., an architecture) 602 to implement some examples. In one examples, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600, including application 528, IO manager 524, and other utility 526 described herein.

The system 602 has a power supply 670, which may be implemented as one or more batteries. The power supply 670 might further include an external power source, such as an AC adapter or a powered docking cradle that supplements or recharges the batteries.

The system 602 may include peripheral device port 678 that performs the function of facilitating connectivity between system 602 and one or more peripheral devices. Transmissions to and from the peripheral device port 672 are conducted under control of the operating system 664. In other words, communications received by the peripheral device port 678 may be disseminated to the application programs 666 via the operating system 664, and vice versa.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with examples of the present invention, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

FIG. 7 illustrates one example of the architecture of a system for providing an application that reliably accesses target data on a storage system and handles communication failures to one or more client devices, as described above. Target data accessed, interacted with, or edited in association with application 528, IO manager 524, other utility 526, and storage may be stored in different communication channels or other storage types. For example, various documents may be stored using a directory service 722, a web portal 724, a mailbox service 726, an instant messaging store 728, or a social networking site 730, application 528, IO manager 524, other utility 526, and storage systems may use any of these types of systems or the like for enabling data utilization, as described herein. A server 720 may provide storage system for use by a client operating on general computing device 502 and mobile device(s) 600 through network 715. By way of example, network 715 may comprise the Internet or any other type of local or wide area network, and client nodes may be implemented as a computing device 502 embodied in a personal computer, a tablet computing device, and/or by a mobile computing device 600 (e.g., a smart phone). Any of these examples of the client computing device 502 or 600 may obtain content from the store 716.

Non-limiting examples describe a computer-implemented method executed or a system comprising a memory, and at least one processor connected with the memory configured to execute a process. The method or process executed comprising: capturing an input at a local platform, transmitting the captured input to a service platform separate from the local platform, receiving, from the service platform, at least one partially evaluated policy generated in response to the captured input, completing the partially evaluated policy by applying information private to the local platform to the partially evaluated policy, and determining a final action for responding to the captured input based on the completing. The determining determines the final action from one or more partially evaluated policies and one or more policies generated by the local platform. A partially evaluated policy includes conditional actions based on the information private to the local platform input in the completing. The inputting comprises plugging values into the partially evaluated policy for missing features associated with the private information to generate a completely evaluated policy. A partially evaluated policy includes instructions as to features that need to be populated by the local platform to generate a completely evaluated policy. As an example, a local platform is an application or service running on a processing device.

In one example, the completing executed further comprising inputting the information private to the local platform into the partially evaluated policy to generate a completely evaluated policy. Determining of the final action occurs by comparing completed policies and selecting the final action based on the comparing. In another example, the method or process further comprising identifying non-sensitive context data associated with the captured input, and transmitting the non-sensitive context data to the service platform with the captured input for generation of the partially evaluated policy. In yet another example, the method or process executed further comprising reporting the final action taken by the local platform to the service platform.

Another non-limiting example describes a computer-readable storage device containing instructions, that when executed on at least one processor, causing the processor to execute a process. The process executed comprising: receiving an input from a local platform, generating, at a service platform separate from the local platform, at least one partially evaluated policy for responding to the received input when the service platform lacks information needed to make a final decision as to how to respond to the received input, wherein the generating applies knowledge data to the received input to generate the partially evaluated policy, and transmitting the partially evaluated policy to the local platform for further evaluation. In one example, generating the partially evaluated policy further comprises filling in information other than private information maintained by the local platform including parameters associated with the private information based on data available to the service platform including the knowledge data. In another example, the generating generates a plurality of partially evaluated policies that are conditional based the information needed to make the final decision maintained by the local platform, and the transmitting transmits the plurality of partially evaluated policies to the local platform to make the final decision based on the transmitted partially evaluated policies and the private information maintained by the local platform.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A computer system comprising:
   at least one processing unit; and
   at least one memory storing computer executable instructions that, when executed by the at least one processing unit, cause the system to perform a method comprising:
   capturing an input by the computer system;
   analyzing, by the computer system, the input to determine that external information is needed to generate a policy from the input;
   transmitting, from the computer system to a service platform, the input to obtain a partially evaluated policy based on external information related to the input, wherein private information is needed to complete the partially evaluated policy;
   receiving, from the service platform at the computer system, at least one partially evaluated policy generated in response to the input;
   completing, by the computer system, the partially evaluated policy by applying to the partially evaluated policy, private information stored on the computer system; and
   determining, by the computer system, a final action for responding to the input based on the completing.

2. The system according to claim 1, wherein completing the partially evaluated policy further comprises inputting the information private to the computer system into the partially evaluated policy to generate a completely evaluated policy.

3. The system according to claim 2, wherein inputting the information private to the computer system further comprises plugging values into the partially evaluated policy for missing features associated with the private information to generate a completely evaluated policy.

4. The system according to claim 1, wherein the partially evaluated policy includes conditional actions based on the information private to the computer system.

5. The system according to claim 1, wherein the partially evaluated policy identifies features that need to be populated by the computer system to generate a completely evaluated policy.

6. The system according to claim 1, wherein the method further comprises:
   identifying non-sensitive context data associated with the captured input; and
   transmitting the non-sensitive context data to the service platform with the captured input for generation of the partially evaluated policy.

7. The system according to claim 1, wherein the method further comprises reporting the final action taken by the computer system to the service platform.

8. The system according to claim 1, wherein the computer executable instructions are included in an application or service running on a processing device.

9. The system according to claim 1, wherein the determining the final action comprises comparing completed policies and selecting the final action based on the comparison.

10. A computer-implemented method comprising:
    capturing an input at a local platform;
    analyzing, by the local platform, the input to determine that external information is necessary to generate a policy from the input;
    transmitting the captured input to a service platform separate from the local platform to obtain a partially evaluated policy based on external information related to the input;
    receiving, from the service platform, at least one partially evaluated policy generated in response to the captured input, wherein private information is needed to complete the at least one partially evaluated policy;
    completing, by the local platform, the partially evaluated policy by applying private information stored on the local platform to the partially evaluated policy; and
    determining, by the local platform, a final action for responding to the captured input based on the completed policy.

11. The computer-implemented method according to claim 10, wherein completing the partially evaluated policy further comprises inputting the private information to the local platform into the partially evaluated policy to generate a completely evaluated policy.

12. The computer-implemented method according to claim 11, wherein the inputting the private information comprises plugging values into the partially evaluated policy for missing features associated with the private information to generate a completely evaluated policy.

13. The computer-implemented method according to claim 10, wherein the partially evaluated policy includes conditional actions based on the information private to the local platform input.

14. The computer-implemented method according to claim 10, wherein the partially evaluated policy identifies features that need to be populated by the local platform to generate a completely evaluated policy.

15. The computer-implemented method according to claim 10, further comprising:
   identifying non-sensitive context data associated with the captured input; and
   transmitting the non-sensitive context data to the service platform with the captured input for generation of the partially evaluated policy.

16. The computer-implemented method according to claim 10, further comprising reporting the final action taken by the local platform to the service platform.

17. The computer-implemented method according to claim 10, wherein determining the final action comprises comparing completed policies and selecting the final action based on the comparison.

18. A computer-readable storage device containing instructions, that when executed on at least one processor, causing the at least one processor to execute a method comprising:
   receiving an input from a local platform at a service platform, wherein the service platform is separate from that local platform;
   generating, at a service platform separate from the local platform, at least one partially evaluated policy for responding to the received input when the service platform lacks information needed to make a final decision as to how to respond to the received input, wherein the generating applies knowledge data to the received input to generate the partially evaluated policy; and
   transmitting the partially evaluated policy to the local platform for further evaluation, wherein private information is needed to complete the partially evaluated policy.

19. The computer-readable storage device according to claim 18, wherein generating the partially evaluated policy further comprises filling in information other than private information maintained by the local platform, wherein the information comprises parameters associated with the private information based on data available to the service platform including the knowledge data.

20. The computer-readable storage device according to claim 18, wherein generating at least one partially evaluated policy comprises generating a plurality of partially evaluated policies that are conditional based the information needed to make the final decision maintained by the local platform, and wherein transmitting the partially evaluated policy comprises transmitting the plurality of partially evaluated policies to the local platform.

* * * * *